(12) United States Patent
Berard et al.

(10) Patent No.: US 7,726,185 B2
(45) Date of Patent: Jun. 1, 2010

(54) SYSTEM AND METHOD FOR MEASURING FLOW IN A PIPELINE

(75) Inventors: Michel Berard, Palaiseau (FR); Ibrahim Babelli, Al-Khobar (SA)

(73) Assignee: Schlumberger Technology Corporation, Cambridge, MA (US)

( * ) Notice: Subject to any disclaimer, the term of this patent is extended or adjusted under 35 U.S.C. 154(b) by 275 days.

(21) Appl. No.: 11/722,841

(22) PCT Filed: Nov. 14, 2005

(86) PCT No.: PCT/EP2005/012158
§ 371 (c)(1),
(2), (4) Date: Apr. 7, 2008

(87) PCT Pub. No.: WO2006/072274
PCT Pub. Date: Jul. 13, 2006

(65) Prior Publication Data
US 2009/0024327 A1  Jan. 22, 2009

(30) Foreign Application Priority Data
Jan. 6, 2005  (GB) .................. 0500191.2

(51) Int. Cl.
*G01F 7/00*  (2006.01)
(52) U.S. Cl. ........................................ 73/195
(58) Field of Classification Search .......... None
See application file for complete search history.

(56) References Cited
U.S. PATENT DOCUMENTS
3,909,603 A     9/1975   Nicolas
4,760,742 A *   8/1988   Hatton .................. 73/861.04
5,127,272 A *   7/1992   Dean et al. ............. 73/861.04
6,755,086 B2 *  6/2004   Salamitou et al. ....... 73/861.04
2004/0112596 A1 6/2004   Williams et al.
2008/0272049 A1* 11/2008 Berard et al. ............. 210/536

FOREIGN PATENT DOCUMENTS
| GB | 2335271 A | 9/1999 |
| GB | 2351810 A | 1/2001 |
| GB | 2380263 A | 4/2003 |
| GB | 2397648 A | 7/2004 |
| GB | 2408328 A | 5/2005 |

OTHER PUBLICATIONS

Miller, Internal Flow Systems, Chapter 8: Friction in Pipes and Passages, BHRA Fluid Engineering Series, 1978, vol. 5, pp. 129-132.
Theron et al., Stratified Flow Model and Interpretation in Horizontal Wells, SPE 36560, 1996, pp. 749-757.
Bamforth et al., Revitalizing Production Logging, Oilfield Review, Winter 1996, pp. 44-60.

* cited by examiner

*Primary Examiner*—Harshad Patel
(74) *Attorney, Agent, or Firm*—Brigid Laffey; Vincent Loccisano; James M. McAleenan

(57) ABSTRACT

A system is provided for measuring flow in a pipeline which, in use, carries a stratified flow of a first liquid and a second, denser liquid. The system comprises: a section of the pipeline in which the stratified flow is uphill; a section of the pipeline in which the stratified flow is downhill; and a holdup meter on each of said pipeline sections for measuring the holdup in each section. The flow rates of the first and second liquids can be calculated from the measured holdups.

31 Claims, 3 Drawing Sheets

SYSTEM AND METHOD FOR MEASURING FLOW IN A PIPELINE

FIELD OF THE INVENTION

The present invention relates to a system and method for measuring flow in a pipeline, and particularly, but not exclusively, for determining liquid flow rates in an oil pipeline.

BACKGROUND OF THE INVENTION

Oil pipelines, particularly those extending from wellheads, typically carry a mixture of oil and water, and often significant amounts of gas.

Typically it is desired to know the flow rates of the oil and water.

A large number of devices are known to the skilled person for performing flow rate measurements. It is generally accepted that no single instrument can perform all the necessary measurements for fully characterising multiphase flow, and so many known flowmeters are composed of a number of devices grouped together. Measuring pressure drop to estimate flowrates, for example, necessitates homogenization of the flow field to alleviate the problem of phase slippage, which requires either changing flow direction abruptly or thorough mixing by a highly intrusive device. In addition to measuring pressure drop, it is often necessary to determine the fraction (by volume, area or cord) that each phase occupies in the measurement pipe. Measurements made by devices used to perform this determination can be susceptible to significant errors as the determinations are either highly dependent on phase properties (e.g. in a microwave water cut meter), or on the presence of one phase with another (e.g. in a Coriolis mass meter). Also, many of these devices intrude on the flow and involve relatively expensive and/or complicated apparatus.

Furthermore, many of them only measure total liquid/fluid flow rates, further measurements and analysis being needed to derive separate oil and water flow rates.

In horizontal or near horizontal pipelines at relatively low flow rates, buoyancy forces tend to separate out the oil and water, and the flow can become stratified. The flow velocities of the oil and water can then differ with slip occurring at the interface between the oil and the water. *Stratified Flow Model and Interpretation in Horizontal Wells*, by B. E. Théron and T. Unwin, Society of Petroleum Engineers (SPE) paper 36560 presents a model of stratified oil-water flows in horizontal wells. A further problem with many known flow rate measuring devices is that they are incompatible with stratified liquid flows where slip occurs at the oil/water boundary.

There is a need for a relatively simple system for measuring liquid flow rates, particularly in stratified liquid flows.

SUMMARY OF THE INVENTION

The present invention is at least partially based on the realisation that as along as the flow velocity is not too high, stratification presents an opportunity for flow rate determination. In particular, when a pipeline carrying a stratified flow of denser and less dense liquids has an upwardly inclined section in the direction of flow, the denser liquid slows down and its holdup does not change appreciably with changes in the flow rate of the denser liquid itself. Its holdup depends, rather, on the flowrate of the less dense liquid. Similarly, when the pipeline has a downwardly inclined section in the direction of flow, the less dense liquid slows down and its holdup does not change appreciably with changes in the flow rate of the less dense liquid itself. Its holdup depends, rather, on the flowrate of the denser liquid. These holdup values can then be used to determine the liquid flow rates.

Thus, in a first aspect the present invention provides a system for use in measuring flow in a pipeline which, in use, carries a stratified flow of a first liquid and a second, denser liquid, the system comprising:

a section of the pipeline in which the stratified flow is uphill;

a section of the pipeline in which the stratified flow is downhill; and a holdup meter on each of said pipeline sections for measuring the holdup in each section. Typically, the system is used for determining liquid flow rates in the pipeline, the flow rates of the first and second liquids being calculable from the measured holdups.

The pipeline sections may be close together or spaced widely apart, as long as no liquid enters or leaves the pipeline in the interval between the sections. Also the downhill section may follow the uphill section, or vice versa.

An advantage of the system is that it can be easily retrofitted to a pipeline that has suitable inclined sections.

The pipeline may be an oil pipeline, the first liquid being oil and the second liquid being water. Typically the pipeline extends from a wellhead and contains well production fluid.

The system is particularly suitable for use in "brown fields", i.e. oil fields that are nearing their end of their useful life and which produce significant amounts of water. In such situations it is helpful to be able to determine rapidly and cheaply, but not necessarily with high degrees of accuracy, the water and oil flow rates.

However, the present invention is generally applicable to situations where stratified flow of two liquids with varying densities occurs. Thus, areas of application of the invention include, but are not limited to, the petrochemical, food, and paint industries.

Preferably, the system comprises a gas diverter upstream of the uphill and downhill sections for removing gas from the pipeline. Many oil wells also produce significant amounts of gas, and such a diverter may then be particularly advantageous as the present inventors have found that the system can be poorly tolerant to gas in the pipeline. The diverted gas may be reintroduced into the pipeline downstream of the uphill and downhill sections.

The angle of inclination of the uphill section to the horizontal may be in the range from 1° to 10°. Preferably the angle of inclination is from 2° to 6°. Particularly in oil pipeline applications, the inventors have found that inclinations beyond 6° can have an adverse effect on stratification.

Similarly, the angle of inclination of the downhill section to the horizontal may be in the range from 1° to 10°, and preferably from 2° to 6°.

The uphill and downhill sections typically have constant angles of inclination over the respective section.

The holdup of the first (less dense) liquid in the uphill section and the holdup of the second (denser) liquid in the downhill section are inversely related to the inclination of the respective sections. This allows the system to be customized to the expected flow rates e.g. by selecting inclination angles which optimise holdup measurement accuracies.

The length of the uphill section may be at least a distance of 10 D, and preferably at least 15 D or 20 D, where D is the internal diameter of the pipeline. At the ends of the uphill section, the flow is affected by the adjoining pipeline sections and the holdup can depart significantly from the value which (ideally) it maintains stably throughout the rest of the section.

Thus, the longer the uphill section, the greater the opportunity for flow stabilization and hence for accurate holdup measurement.

For similar reasons, the length of the downhill section may be at least a distance of 10 D, and preferably at least 15 D or 20 D, where D is the internal diameter of the pipeline.

An interpretation model which relates the holdup measurements to the liquid flow rates is discussed in detail below. This model involves friction coefficients for the first liquid/pipeline interface, the second liquid/pipeline interface, and the first liquid/second liquid interface. Values for the first two coefficients are generally available to the skilled person. However, the friction coefficient for the first liquid/second liquid interface may be problematic to determine, in which case the system may further comprise a third (preferably horizontal) section of pipeline and a holdup meter on that section. As discussed in detail below, the holdup value for the third section may be used to determine the friction coefficient for the first liquid/second liquid interface.

As an alternative to applying an interpretation model, however, the system may merely be calibrated to relate holdup measurements to a range of known first and second liquid flow rates.

The system may further comprise a computer-based system for calculating the flow rates from the measured holdups, and optionally also the measured friction coefficients.

A plurality of holdup meters may be positioned at spaced axial positions along the respective pipeline section so that a plurality of holdup measurements can be obtained for each section. An average value for the holdup can then be derived from the measurements.

Conveniently, the or each holdup meter may comprise a plurality of sensors spaced around at least a part of a circumference of the respective pipeline, the sensors determining the position of the first liquid/second liquid boundary on the basis of differing properties for the first and second liquids. The holdup then follows from the position of the boundary and the (known) geometry of the transverse internal cross-section of the pipeline at the circumference.

The sensors may be electronic sensors sensing electrical properties. However, any sensors capable of detecting contrasting physical or chemical properties may be used. For example, optical sensors may be employed.

However, if electronic sensors are used, each sensor may comprise a spark plug, as manufactured for use in an internal combustion engine (ICE), each spark plug being arranged to perform electrical measurements across the wall of the pipeline. Spark plugs have electrical insulation, temperature and pressure ratings which in general are above the ratings (typically 100,000 V, 200° C., 5,000 psi) required in the oil industry. They are also readily obtainable even in poorly developed countries or remote oilfield environments, making spark plug-based sensors simple and inexpensive to produce.

The downhill pipeline section may have, in transverse internal cross-section, a main portion which occupies a major part of the cross-sectional area, and a lower portion which occupies a minor part of the cross-sectional area and which is contiguous with and extends downwards from the main portion, the height-to-width ratio of the lower portion being greater than the height-to-width ratio of the main portion. Such a configuration for the pipeline is particularly advantageous when the holdup of the second, denser liquid is low. In such circumstances, if the pipeline were to have a simple circular transverse internal cross section, the measurement accuracy for the position of the first liquid/second liquid boundary would also be low. In contrast, the internal cross section of the lower portion has an increased height-to-width ratio, so that when the first liquid/second liquid boundary is in this portion a change in holdup produces a larger change in the height of the boundary. This leads to an improved measurement accuracy. Preferably, the main portion and the lower portion together form a keyhole shape.

Likewise, the uphill pipeline section may have, in transverse internal cross-section, a main portion which occupies a major part of the cross-sectional area, and an upper portion which occupies a minor part of the cross-sectional area and which is contiguous with and extends upwards from the main portion, the height-to-width ratio of the upper portion being greater than the height-to-width ratio of the main portion. This configuration is advantageous when the holdup of the first, less dense liquid is low. Preferably, the main portion and the upper portion together form a keyhole shape.

In embodiments where the or each holdup meter comprises a plurality of sensors spaced around at least a part of a circumference of the respective pipeline, the sensors may be spaced around the lower and/or upper portion.

A further aspect of the invention provides a method for determining liquid flow rates in a pipeline, the method comprising:

carrying a stratified flow of a first liquid and a second, denser liquid along the pipeline, the pipeline having a section in which the stratified flow is uphill, and a section in which the stratified flow is downhill, measuring the holdup in each pipeline section; and calculating the flow rates of the first and second liquids from the measured holdups.

Thus the method of this aspect of the invention corresponds to the system of the first aspect, and optional features of the first aspect described herein pertain also to the method of the present aspect.

BRIEF DESCRIPTION OF THE DRAWINGS

Embodiments of the invention will now be described by way of example with reference to the accompanying drawings in which.

DETAILED DESCRIPTION

Figure 1:
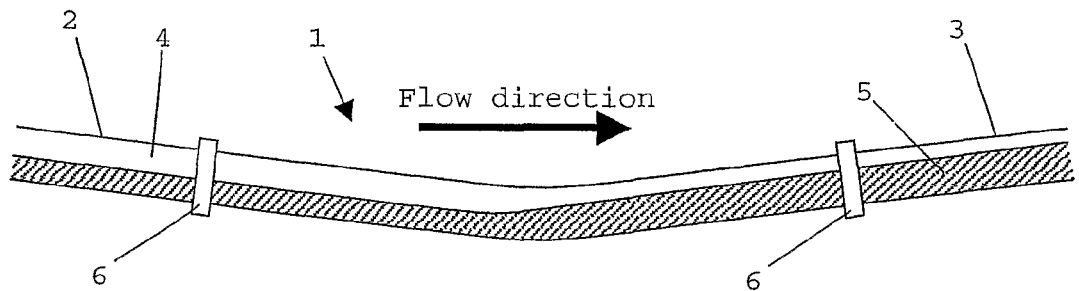
FIG. 1 shows schematically an oil pipeline.

FIG. 1 shows schematically an oil pipeline 1 having an downwardly inclined section 2 followed by an upwardly inclined section 3. A stratified flow of oil 4 and denser water 5 flows along the pipeline in the direction indicated. Each section has a holdup meter 6 for measuring the respective holdup in that section. The holdup meters (described in more detail below) are located away from the ends of the sections to avoid the influence of flow in adjacent sections.

Preferably, a gas diverter (not shown) of known type is installed upstream of the inclined sections to remove any gas from the liquid flow. The diverted gas may be reintroduced into the pipeline downstream of the inclined sections.

SPE paper 36560 (which is hereby incorporated by reference) provides an interpretation model of stratified oil-water flow in near horizontal wells. The model explains why, in the downhill section, the holdup is mainly governed by the water flow rate, and, in the uphill, it is mainly governed by the oil flow rate.

Essentially, as long as the total liquid flow rate is moderate (which is anyway a requirement for stratified flow), when the flow is uphill, the water is handicapped and runs slowly, but occupies most of the room, and the oil runs fast but occupies little room. Conversely, when the flow is downhill, the oil is handicapped and runs slowly, but occupies most of the room, and the water runs fast but occupies little room.

Equation (5) of SPE paper 36560 provides a function F which, when equal to zero, corresponds to steady state stratified oil and water flow in an inclined pipeline. The equation contains factors accounting for the presence of a tool body in the pipeline, but these factors can be ignored for present purposes.

Subsequent analysis in SPE paper 36560 then shows that F is a non-linear function of the dynamic parameters: oil velocity $U_o$; water velocity $U_w$; and water holdup $H_w$ ($H_w=1-H_o$, where $H_o$ is the oil holdup). It is also a function of the static parameters: transverse internal cross-sectional geometry of the pipeline (which in the case of a circular pipe is simply characterised by its diameter); inclination angle of the pipeline; oil and water densities; and friction coefficients for the oil/pipeline interface, water/pipeline interface, and oil/water interface.

Most of the static parameters can be readily determined. For example, pipeline diameter (or internal cross-sectional geometry if a non-circular pipe) and inclination angle are easily measurable, and suitable values of the friction coefficients for the oil/pipeline interface and water/pipeline interface for various pipeline materials and surface finishes are known to the skilled person, see e.g. D. S. Miller, *Internal Flow Systems*, British Hydromechanics Research Association (BHRA), Bedford, United Kingdom, (1978), pp 130-132.

If the friction coefficient for the oil/water interface, $f_i$, is known, the flow model can be summarised as $F(U_o, U_w, H_w)=0$. This non-linear algebraic equation is a function of three independent variables. Thus, by providing a value of $H_w$ for two different angles of inclination (i.e. for the uphill and downhill sections), it is possible to solve for $U_o$ and $U_w$, and hence for the oil and liquid flow rates, $Q_o$ and $Q_w$ ($Q_o=U_oH_oA$ and $Q_w=U_oH_wA$, where A is the pipeline's transverse internal cross-sectional area).

However, more generally the friction coefficient for the oil/water interface, $f_i$, is not known, and the flow model can be summarised as $F(U_o, U_w, f_i, H_w)=0$. In this case, one option is to provide a third, preferably horizontal, section of pipeline (not shown in FIG. 1, but which can be upstream of, downstream of or between the inclined sections), and a holdup meter on that section. There are then three unknowns (i.e. $f_i$, $U_o$ and $U_w$) but three equations (i.e. F=0 for the two inclined sections and the third section) which can solved iteratively for $f_i$, $U_o$ and $U_w$.

When the third section is horizontal, $f_i$ can be determined from Equation (13) of SPE paper 36560, which provides a correlation, $f_i=\delta Re_i^\zeta$, expressing $f_i$ in terms of a Reynolds number, $Re_i$, based on the oil and water slip velocity (see Equation (11) of SPE paper 36560). We have found that taking $\delta=0.007$ and $\zeta=0.3$ generally provides an acceptable initial value for $f_i$, which can be improved by subsequent iterations. In less preferred embodiments, when the third section is not horizontal, $f_i$ can be determined from equation (12) of SPE paper 36560, which provides a correlation, $f_i=\alpha Fr_i^\beta Re_i^\gamma$, expressing $f_i$ in terms of $Re_i$ and the Froude number, $Fr_i$ (see Equation (10) of SPE paper 36560). We have found that taking $\alpha=0.007$, $\beta=-0.19$ and $\gamma=0.3$ generally provides an acceptable initial value for $f_i$.

The above approach for determining $f_i$ serves as an example. If the skilled person knows of other ways of determining $f_i$, these may be used instead.

Figure 2:
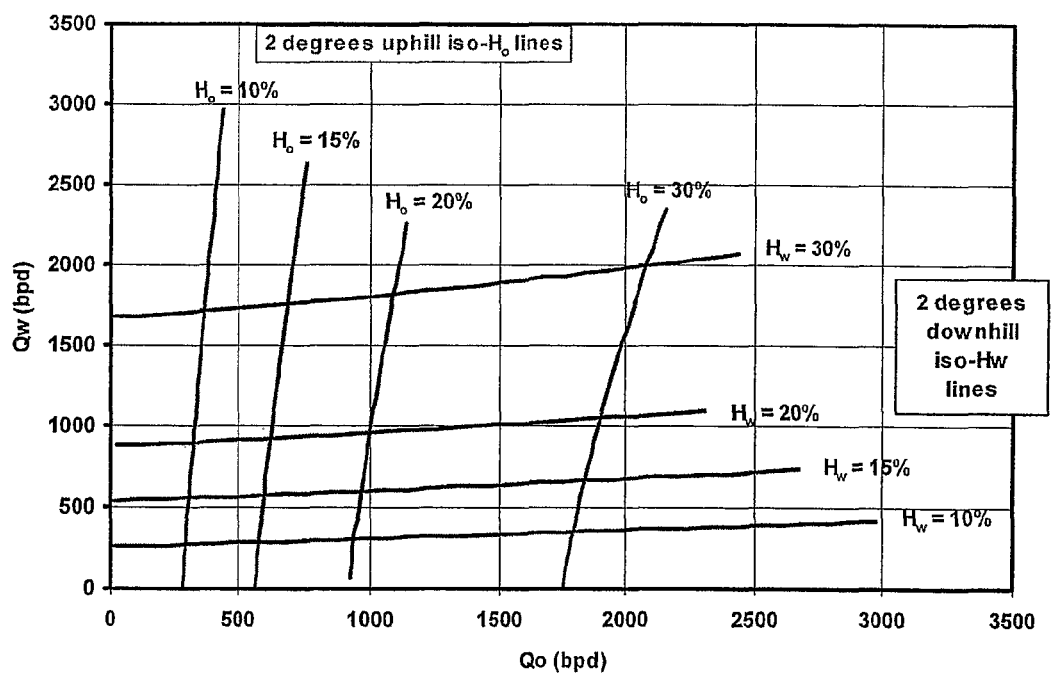
FIG. 2 shows predict plots of water flow rate, $Q_w$, against oil flow rate, $Q_o$, for two pipeline inclinations and different holdup values.

FIG. 2 shows the result of using F to predict $Q_w$ at different values of $Q_o$ for simulated steady state stratified oil and water flow in a 6" (15 cm) diameter pipeline. One set of predictions is for a 2° uphill pipeline section and the other is for a 2° downhill pipeline section, and within each set $Q_w$ is predicted for different holdup values, leading to iso-H lines.

The iso-$H_w$ lines for the downhill section are nearly parallel to the horizontal axis, confirming that, in this section, the holdup is mainly governed by the water flow rate. In contrast, the iso-$H_o$ lines for the uphill section are nearly parallel to the vertical axis, confirming that, in this section, the holdup is mainly governed by the oil flow rate.

Thus if, for example, $H_o$ is found to be 10% in the uphill section and $H_w$ is 30% in the down hill section, it is possible to infer from the point of intersection of the corresponding iso-H lines that the $Q_w$ is around 1700 bpd (200 m³/day) and $Q_o$ is around 350 bpd (42 m³/day).

By employing uphill and downhill sections, the iso-H lines for one section are nearly orthogonal to the iso-H lines for the other section, which can lead to accurate identification of the point of intersection of iso-H lines from the different sections, and hence accurate determination of $Q_w$ and $Q_o$.

As an alternative to implementing an interpretation model, however, it is possible merely to calibrate the system by relating holdup measurements to different known liquid flow rates. However, this approach does require the use of separate apparatus for measuring the oil and water flow rates. Also periodic recalibration may be necessary.

A computer-based system (not shown in FIG. 1) may be used for calculating the flow rates from the measured holdups. For example, the computer-based system may have a memory device which carries the interpretation model, an input device which accepts signals corresponding to the measured holdups and measured friction coefficients, and a processor which calculates the liquid flow rates based on the measured holdups and the friction coefficients. Alternatively, the computer-based system may have a memory device which carries correlating means (such as a look-up table or a neural network) for correlating holdup values in the uphill and downhill sections with calibration oil and water flow rates, an input device which accepts signals corresponding to the measured holdups, and a processor which calculates the liquid flow rates based on the measured holdups and the correlating means. The correlating means may be periodically updatable to take account of subsequently obtained holdup/flow rate correlations. The computer-based system may further have a display for displaying the calculated liquid flow rates.

Figure 3:
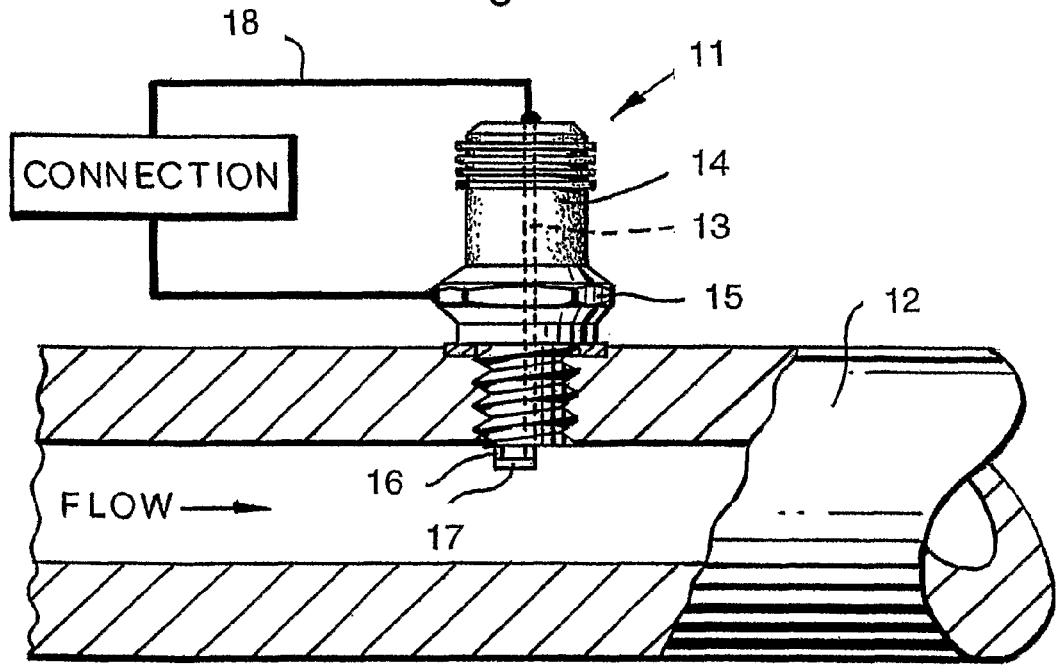
FIG. 3 shows schematically an electronic sensor based on an ICE spark plug.

Each holdup meter 6 shown in FIG. 1 can be formed from a plurality of electronic sensors spaced around at least a part of the circumference of the respective pipeline, the sensors determining the position of the first liquid/second liquid boundary on the basis of differing electronic properties for the first and second liquids Conveniently, the electronic sensors can be based on ICE spark plugs. FIG. 3 shows an ICE spark plug 11 mounted in a wall 12 of an oil pipe. The spark plug has a central electrode 13, a ceramic insulator 14 and a steel outer conductor body 15. The conventional side electrode 16 of the outer body has been shortened so that it and the adjacent end of the central electrode can support a sensing element 17 for sensing the resistivity/conductivity of the liquid flowing within the pipe.

An external electrical circuit 18 joins the central electrode and outer conductor body and they can thus be used to communicate electrical power to the sensing element so that it can perform measurements.

Figure 4:
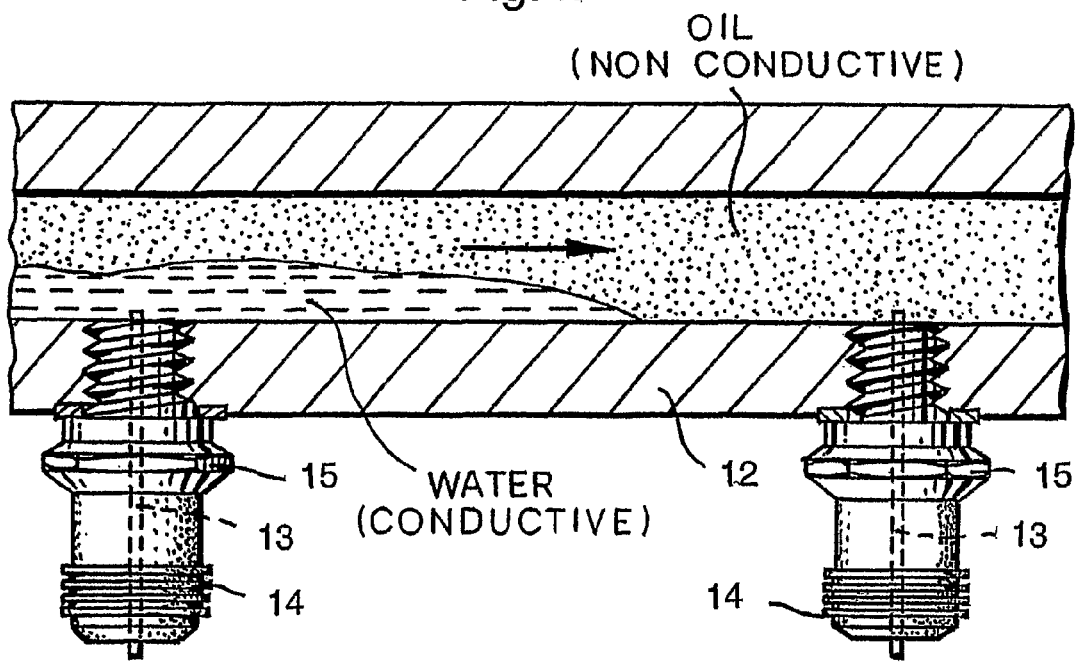
FIG. 4 shows schematically two further sensors based on ICE spark plugs mounted spaced apart in a wall of an oil pipe.

FIG. 4 shows another form of the spark plug-based electronic sensor in which the side electrode of the spark plug has been entirely removed. In FIG. 4, for illustration purposes, two of these sensors are mounted spaced apart in a wall of an oil pipe. Equivalent features have the same reference numbers in FIGS. 3 and 4.

When water is present (as at the left hand sensor), an electrical short occurs between the central electrode and outer conductor body. Conversely, if there is only oil in the pipe (as at the right hand sensor), the impedance between the central electrode and outer conductor body is effectively infinite. Thus the presence of a water/oil interface between the two electrodes can be detected by detecting the different impedances between the central electrode and outer conductor body of the electrodes.

Figure 5:
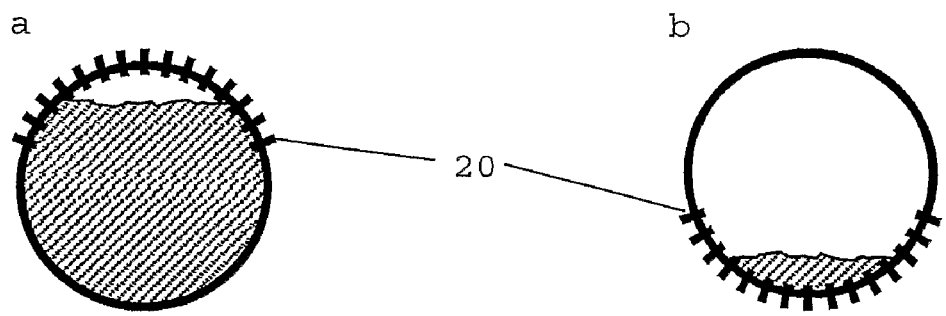
FIGS. 5a and b show schematically respective transverse circular cross-sections through uphill and downhill pipelines with holdup meters mounted at the cross-sections.

FIGS. 5a and b show respective holdup meters formed from arrays of local water/oil probes 20, which could be based on spark plugs. FIG. 5a shows a meter for the uphill section 3 of FIG. 1 where the oil holdup is small, and FIG. 5b shows a meter for the downhill section 2 of FIG. 1 where the water holdup is small. The sensors locate the position of the oil/water boundary, which in turn determines the holdup. A problem with the particular pipeline/sensor arrangement, however, is that the pipelines are of circular section, leading to increasing measurement inaccuracy for the position of the oil/water boundary as the oil holdup in FIG. 5a and the water holdup in FIG. 5b decrease.

Figure 6:
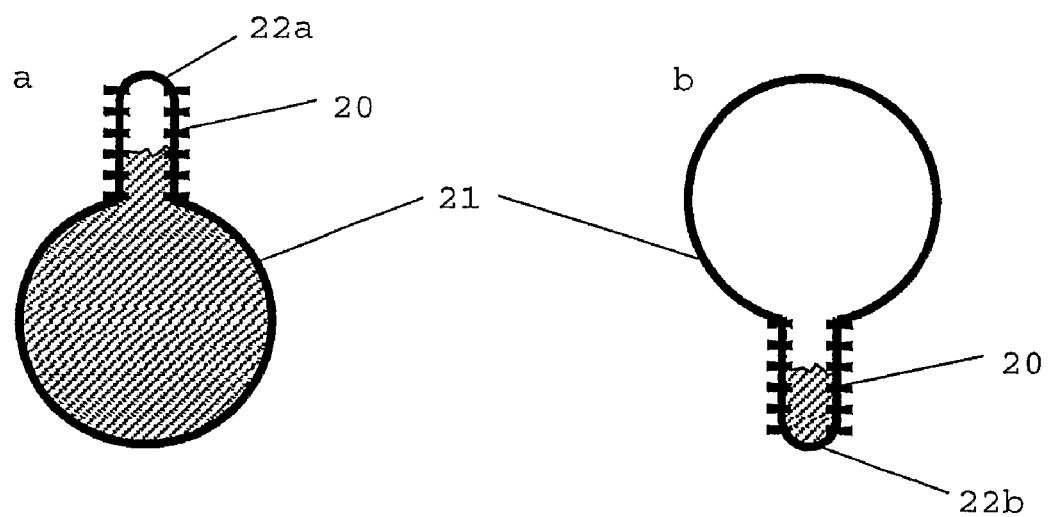
FIGS. 6a and b show schematically respective transverse keyhole-shaped cross-sections through uphill and downhill pipelines with holdup meters mounted at the cross-sections.

FIGS. 6a and b show alternative holdup meters, again based on arrays of local water/oil probes 20. In FIGS. 6a and b, the pipelines have a keyhole-shaped cross-section so that there is a circular main portion 21 which occupies a major part of the cross-sectional area, and an upwardly extending channel portion 22a in the case of the uphill section (FIG. 6a) and a downwardly extending channel portion 22b in the case of the downhill section (FIG. 6b). In each of FIGS. 6a and b, the channel portion occupies a minor part of the total cross-sectional area, but contains the oil/water boundary. The height-to-width ratio of the channel portion is significantly greater than the height-to-width ratio of the main portion. In this way, changes in holdup always lead to significant changes in the height of the oil/water boundary in the channel portion, and this in turn can be accurately measured by the water/oil probes spaced around the circumference of the respective pipeline at the channel portion.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A system for use in measuring flow in a pipeline which, in use, carries a stratified flow of a first liquid and a second, denser liquid, the system comprising:
   a section of the pipeline in which the stratified flow is uphill;
   a section of the pipeline in which the stratified flow is downhill; and
   a holdup meter on each of said pipeline sections for measuring the holdup in each section.

2. A system for measuring flow according to claim 1, further comprising a computer-based system for calculating the flow rates of said first and second liquids from the measured holdups.

3. A system for measuring flow according to claim 1, wherein the pipeline is an oil pipeline, the first liquid being oil and the second liquid being water.

4. A system for measuring flow according to claim 1, further comprising a gas diverter upstream of said pipeline sections for removing gas from the pipeline.

5. A system for measuring flow according to claim 1, wherein the angle of inclination of the uphill section to the horizontal is in the range from 1° to 10°.

6. A system for measuring flow according to claim 1, wherein the angle of inclination of the downhill section to the horizontal is in the range from 1° to 10°.

7. A system for measuring flow according to claim 1, wherein the length of the uphill section is at least a distance of 10 D, where D is the internal diameter of the pipeline.

8. A system for measuring flow according to claim 1, wherein the length of the downhill section is at least a distance of 10 D, where D is the internal diameter of the pipeline.

9. A system for measuring flow according to claim 1, further comprising:
   a horizontal section of pipeline; and
   a holdup meter on the horizontal section for measuring the holdup in that section.

10. A system for measuring flow according to claim 1, wherein the downhill pipeline section has, in transverse internal cross-section, a main portion which occupies a major part of the cross-sectional area, and a lower portion which occupies a minor part of the cross-sectional area and which is contiguous with and extends downwards from the main portion, the height-to-width ratio of the lower portion being greater than the height-to-width ratio of the main portion.

11. A system for measuring flow according to claim 10, wherein, in transverse internal cross-section, the main portion and the lower portion together form a keyhole shape.

12. A system for measuring flow according to claim 10, wherein the or each holdup meter comprises a plurality of sensors spaced around at least a part of a circumference of the respective pipeline, the sensors determining the position of the first liquid/second liquid boundary on the basis of differing properties for the first and second liquids, and wherein the sensors are spaced around said lower portion.

13. A system for measuring flow according to claim 1, wherein the uphill pipeline section has, in transverse internal cross-section, a main portion which occupies a major part of the cross-sectional area, and an upper portion which occupies a minor part of the cross-sectional area and which is contiguous with and extends upwards from the main portion, the height-to-width ratio of the upper portion being greater than the height-to-width ratio of the main portion.

14. A system for measuring flow according to claim 13, wherein, in transverse internal cross-section, the main portion and the upper portion together form a keyhole shape.

15. A system for measuring flow according to claim 13, wherein the or each holdup meter comprises a plurality of sensors spaced around at least a part of a circumference of the respective pipeline, the sensors determining the position of the first liquid/second liquid boundary on the basis of differing properties for the first and second liquids, and wherein the sensors are spaced around said upper portion.

16. A system for measuring flow according to claim 1, wherein the or each holdup meter comprises a plurality of sensors spaced around at least a part of a circumference of the respective pipeline, the sensors determining the position of the first liquid/second liquid boundary on the basis of differing properties for the first and second liquids.

17. A system for measuring flow according to claim 16, wherein each sensor is an electronic sensor comprising a spark plug, as manufactured for use in an internal combustion engine, the spark plug being mounted in a wall of the pipeline and arranged to perform electrical measurements on liquid in the pipeline.

18. A method for determining liquid flow rates in a pipeline, the method comprising:
  carrying a stratified flow of a first liquid and a second, denser liquid along the pipeline, the pipeline having a section in which the stratified flow is uphill, and a section in which the stratified flow is downhill,
  measuring the holdup in each pipeline section; and
  calculating the flow rates of the first and second liquids from the measured holdups.

19. A method for determining liquid flow rates according to claim 18, wherein the pipeline is an oil pipeline, the first liquid being oil and the second liquid being water.

20. A method for determining liquid flow rates according to claim 18, further comprising removing gas from the pipeline upstream of said pipeline sections.

21. A method for determining liquid flow rates according to claim 18, wherein the angle of inclination of the uphill section to the horizontal is in the range from 1° to 10°.

22. A method for determining liquid flow rates according to claim 18, wherein the angle of inclination of the downhill section to the horizontal is in the range from 1° to 10°.

23. A method for determining liquid flow rates according to claim 18, wherein the length of the uphill section is at least a distance of 10 D, where D is the internal diameter of the pipeline.

24. A method for determining liquid flow rates according to claim 18, wherein the length of the downhill section is at least a distance of 10 D, where D is the internal diameter of the pipeline.

25. A method for determining liquid flow rates according to claim 18, wherein the pipeline further has a horizontal section, the method further comprises measuring the holdup in the horizontal pipeline section, and the holdup in the horizontal section is used in the calculation of the flow rates of the first and second liquids.

26. A method for determining liquid flow rates according to claim 18, wherein the downhill pipeline section has, in transverse internal cross-section, a main portion which occupies a major part of the cross-sectional area, and a lower portion which occupies a minor part of the cross-sectional area and which is contiguous with and extends downwards from the main portion, the height-to-width ratio of the lower portion being greater than the height-to-width ratio of the main portion.

27. A method for determining liquid flow rates according to claim 26, further comprising providing a plurality of spaced sensors around at least a part of a circumference of the or each pipeline section; and
  wherein the step of measuring the holdup in each pipeline section comprises using the sensors to determine the position of the first liquid/second liquid boundary on the basis of differing properties for the first and second liquids, and wherein the sensors are spaced around said lower portion.

28. A method for determining liquid flow rates according to claim 18, wherein the uphill pipeline section has, in transverse internal cross-section, a main portion which occupies a major part of the cross-sectional area, and an upper portion which occupies a minor part of the cross-sectional area and which is contiguous with and extends upwards from the main portion, the height-to-width ratio of the upper portion being greater than the height-to-width ratio of the main portion.

29. A method for determining liquid flow rates according to claim 28, further comprising providing a plurality of spaced sensors around at least a part of a circumference of the or each pipeline section; and
  wherein the step of measuring the holdup in each pipeline section comprises using the sensors to determine the position of the first liquid/second liquid boundary on the basis of differing properties for the first and second liquids, and wherein the sensors are spaced around said upper portion.

30. A method for determining liquid flow rates according to claim 18, further comprising providing a plurality of spaced sensors around at least a part of a circumference of the or each pipeline section; and
  wherein the step of measuring the holdup in each pipeline section comprises using the sensors to determine the position of the first liquid/second liquid boundary on the basis of differing properties for the first and second liquids.

31. A method for determining liquid flow rates according to claim 30, wherein each sensor is an electronic sensor comprising a spark plug, as manufactured for use in an internal combustion engine, the spark plug being mounted in a wall of the pipeline and arranged to perform electrical measurements on liquid in the pipeline.

* * * * *